(12) United States Patent
Child

(10) Patent No.: US 9,202,291 B1
(45) Date of Patent: Dec. 1, 2015

(54) VOLUMETRIC CLOTH SHADER

(71) Applicant: Pixar, Emeryville, CA (US)

(72) Inventor: Philip Child, Emeryville, CA (US)

(73) Assignee: Pixar, Emeryville, CA (US)

( * ) Notice: Subject to any disclaimer, the term of this patent is extended or adjusted under 35 U.S.C. 154(b) by 134 days.

(21) Appl. No.: 13/828,811

(22) Filed: Mar. 14, 2013

Related U.S. Application Data

(60) Provisional application No. 61/664,912, filed on Jun. 27, 2012.

(51) Int. Cl.
  G06T 15/00 (2011.01)
  G06T 15/50 (2011.01)
  G09G 5/00 (2006.01)
  G06K 9/40 (2006.01)
  G06K 9/36 (2006.01)
  G06T 11/00 (2006.01)

(52) U.S. Cl.
  CPC .................................... *G06T 11/001* (2013.01)

(58) Field of Classification Search
  USPC ......... 345/418–419, 426, 428, 581–582, 501, 345/522, 611; 382/254, 274, 285
  See application file for complete search history.

(56) References Cited

U.S. PATENT DOCUMENTS

| | | | |
|---|---|---|---|
| 6,037,949 A | 3/2000 | DeRose et al. | |
| 2006/0028468 A1* | 2/2006 | Chen et al. | 345/424 |
| 2006/0267978 A1* | 11/2006 | Litke et al. | 345/419 |
| 2007/0216905 A1* | 9/2007 | Han et al. | 356/446 |
| 2008/0021679 A1* | 1/2008 | Bleiweiss et al. | 703/2 |
| 2008/0303840 A1 | 12/2008 | Zhou et al. | |
| 2010/0074532 A1* | 3/2010 | Gordon et al. | 382/203 |
| 2010/0231692 A1* | 9/2010 | Perlman et al. | 348/48 |
| 2012/0038639 A1* | 2/2012 | Mora et al. | 345/420 |
| 2013/0187940 A1* | 7/2013 | Damez et al. | 345/582 |

OTHER PUBLICATIONS http://nopjia.blogspot.com/2012/03/ray-marching-distnace-fields-in-real.html, Nop Jiarathanakul, Mar. 2012, pp. 1-2.*

Press et al., *Numerical Recipes in C: The Art of Scientific Computing*, Sections 9.4-9.5, Newton-Raphson, Method Using Derivative, Root Finding and Nonlinear Sets of Equations, pp. 362-369, 1992.

Groller, Eduard, Rene T. Rau, and Wolfgang StraBer. Modeling textiles as three dimensional textures. Springer Vienna, 1996.

Bruderlin, Armin. "A method to generate wet and broken-up animal fur." Computer Graphics and Applications, 1999. Proceedings. Seventh Pacific Conference on. IEEE, 1999.

Non-Final Office Action, dated Apr. 2, 2015, for U.S. Appl. No. 13/828,712, 17 pages.

(Continued)

*Primary Examiner* — Wesner Sajous
(74) *Attorney, Agent, or Firm* — Kilpatrick Townsend & Stockton LLP

(57) ABSTRACT

In various embodiments, an ray-marched-tangent space shader is provided which uses adaptive, curved ray marching of an implicit weave/thread procedural texture to create the appearance of individual cloth yarns complete with sub-fibers which separate rather than stretch over the surface. The volumetric surface shader shades cloth by performing adaptive curved ray marching of an implicit tangent space distance field.

20 Claims, 9 Drawing Sheets

(56) References Cited

OTHER PUBLICATIONS

Final Office Action, dated Oct. 15, 2015, for U.S. Appl. No. 13/828,712, filed Mar. 14, 2013, 16 pages.

Durupinar, Funda, and Ugur Gudukbay. "Procedural visualization of knitwear and woven cloth." Computers & Graphics 31.5 (2007): 778-783.

* cited by examiner

VOLUMETRIC CLOTH SHADER

CROSS-REFERENCE TO RELATED APPLICATIONS

This application is a non-provisional of and claims the benefit and priority under 35 U.S.C. 119(e) of U.S. Provisional Patent Application No. 61/664,912, filed Jun. 27, 2012 and entitled "Volumetric Cloth Shader," the entire contents of which are incorporated herein by reference for all purposes.

BACKGROUND

This disclosure relates to computer-generated imagery (CGI) and computer-aided animation. More specifically, this disclosure relates to techniques for volumetric shading for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

Accordingly, what is desired is to solve one or more of the problems relating to shading and rendering of cloth for use in CGI and computer-aided animation, some of which may be discussed herein. Additionally, what is desired is to reduce some of the drawbacks relating to shading and rendering of cloth for use in CGI and computer-aided animation, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, an ray-marched-tangent space shader is provided which uses adaptive, curved ray marching of an implicit weave/thread procedural texture to create the appearance of individual cloth yarns complete with sub-fibers which separate rather than stretch over the surface. The volumetric surface shader shades cloth by performing adaptive curved ray marching of an implicit tangent space distance field.

In further embodiments, a renderman plugin is provided which builds a cloth weave structure from curves over the surface of a subdivision mesh at rendertime. Many problems had to be solved for this such as global weave coherence issues. In one aspect, UV space to subdivision space mapping and numerous shading issues where corrected or compensated for. In some embodiments, curves are computed in per-face batches to keep memory use to a minimum. In another aspect, to achieve face-to-face yarn coherence, warp and weft (u & v) coordinates can be pre-computed in a parent RiProcedural. To avoid uv to world space distortion, in some embodiments, one or more Newton iterations are applied, such as to the initial yarn positions. Shading signals (such as local occlusion) can be baked into the curves as they were generated. A simplified version of the distance field shader above can be used to render sub-yarn fibers.

In one embodiment, a method for shading surfaces includes receiving, at one or more computer systems, information identifying a surface of a first object. Information is received defining a signed distance field associated with the surface specifying a texture. The surface is ray marched based on the signed distance field to determine placement in the tangent space of the surface of a portion of the texture. Information configured to render the texture is generated based on the determined placement of at least the portion of the texture.

In some embodiments, local surface curvature is determined of a portion of the surface. Information configured to compensate for local stretching of the texture at the portion of the surface is generated. Ray marching into the signed distance field may include curving a ray based on the signed distance field. Ray marching into the signed distance field may include determining a next step-size based on a value of the signed distance field that is different from the previous step-size.

In further embodiments, generating the information configured to render the texture may include determining a volume within the surface representing the texture. The texture may represent cloth or scales or other volumetric features of the surface. One or more images of the surface may be rendered based on the information configured to render the texture.

In one embodiment, a non-transitory computer-readable medium storing computer-executable code for shading surfaces includes code for receiving information identifying a surface of a first object, code for receiving information defining a signed distance field associated with the surface specifying a texture, code for ray-marching the surface based on the signed distance field to determine placement in the tangent space of the surface of a portion of the texture, and code for generating information configured to render the texture based on the determined placement of at least the portion of the texture.

In one embodiment, a system for shading surfaces includes a processor and a memory configured to store a set of instructions which when executed by the processor configured the processor to receive information identifying a surface of a first object, receive information defining a signed distance field associated with the surface specifying a texture, ray-march the surface based on the signed distance field to determine placement in the tangent space of the surface of a portion of the texture, and generate information configured to render the texture based on the determined placement of at least the portion of the texture.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or or examples, or the presently understood best mode of any innovations presented within this disclosure.

DETAILED DESCRIPTION

Figure 1:
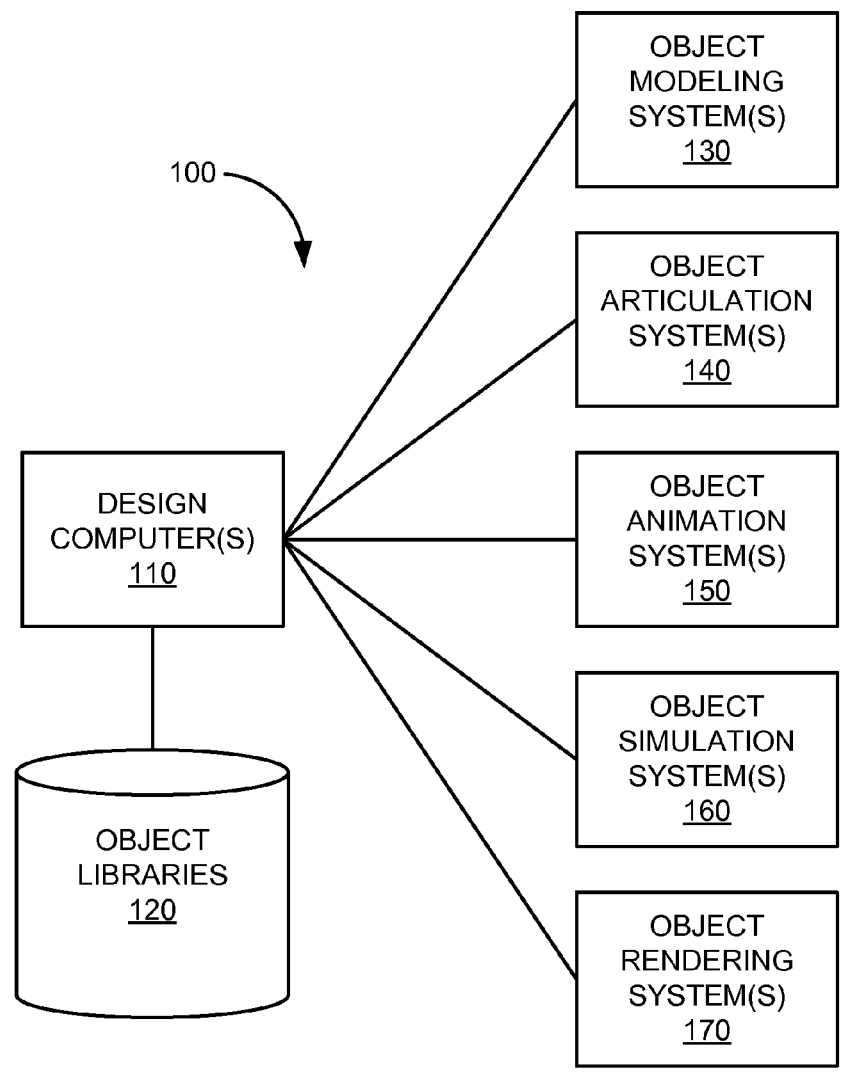
FIG. 1 is a simplified block diagram of a system for creating computer graphics imagery (CGI) and computer-aided animation that may implement or incorporate various embodiments or techniques for shading and rendering cloth.

FIG. 1 is a simplified block diagram of system 100 for creating computer graphics imagery (CGI) and computer-aided animation that may implement or incorporate various embodiments or techniques for shading and rending cloth. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for shading and rendering cloth.

Ray Marching Shader

In various embodiments, an ray-marched-tangent space shader is provided which uses adaptive, curved ray marching of an implicit weave/thread procedural texture to create the appearance of individual cloth yarns complete with sub-fibers which separate rather than stretch over the surface. The volumetric surface shader shades cloth by performing adaptive curved ray marching of an implicit tangent space distance field.

In one aspect, the volumetric surface shader incorporates two parts. First, a curved, adaptive ray marcher is designed for ray marching into the interior of surfaces, such as subdivision or polygon meshes. For example, given a surface such as a polygon mesh, the ray marcher makes shading evaluations at the outer surface point initially being shaded. The ray marcher then takes small steps along a curved path, evaluating an arbitrary input distance field at each step. This allows a volume to be rendered within the surface. In some embodiments, the curvature of the path is defined by an extrapolation of the curvature at the ray's entry point, for example, the point on the mesh surface where the ray begins. The ray marching takes place in tangent-space (e.g., a coordinate space defined by the normal and tangents of the surface point being shaded). This space is different for every point being shaded since the normal and tangents are varying across the surface of a mesh.

Accordingly, a curved ray solves the problem that when raymarching through an input signal (texture) in tangent space, a visible silhouette of the distance field signal is not visible along the camera-relative (facing ratio) edge of the rendered surface. Thus, the impression is given that the pattern is curved and lays just under the surface of the surface to be rendered. By bending the ray instead of bending the input signal, the same visual result can be more readily achieve.

In various embodiments, the step-size of the ray marcher is adaptive. In one aspect, the step size is adjusted based on the value of the distance-field. For example, the smaller the value, the smaller the step-size. This allows large steps to be taken when the ray position lays far away from the center of our input signal.

The second part involves generation of a fast signed distance field pattern which describes woven materials. In general, a very efficient way is needed to describe course, hand-made, woven materials, such as burlap, where the threads are individually visible to camera. Such a process should obviously repeating patterns to give the effect of being course and hand-made while also utilizing as little as possible memory or CPU time to compute.

In various embodiments, a function is created for approximating the yarns of woven thread by the use of distorted implicit cylinders. Centerlines of each thread (or corresponding cylinder) in each direction are developed from a UV map. A signal is then developed which tells each point on the surface how far it is from a thread centerline. This signal is extended into the space surrounding the centerline so that the thread takes on a volumetric quality. Cylinders can also then subdivided into child sub-cylinders which were calculated in polar coordinates radiating from the center of each parent cylinder.

In one aspect, the function also provided local ambient occlusion (i.e., occlusion from yarn to yarn) for free since the distances of neighboring yarns are known from the distance field calculation.

In further embodiments, the function is extended to fix the general texturing issue of uniformally, physically-unrealistic texture stretching. A stretch and compression of the area of the surface being shaded is calculated and fed into the distance-field calculation to create a variety of effects such as yarn sliding and fiber spreading under compression. This technique could be extended to other patterns in addition to cloth, such as scales sliding on a reptile.

Many input parameters can be provided which control the layout and appearance of the distance field. An input pattern defines which yarns lay under of over each other just as a real-life weaving pattern does. This allows for a large variation of weave styles (e.g., hounds tooth or herringbone).

Figure 2:
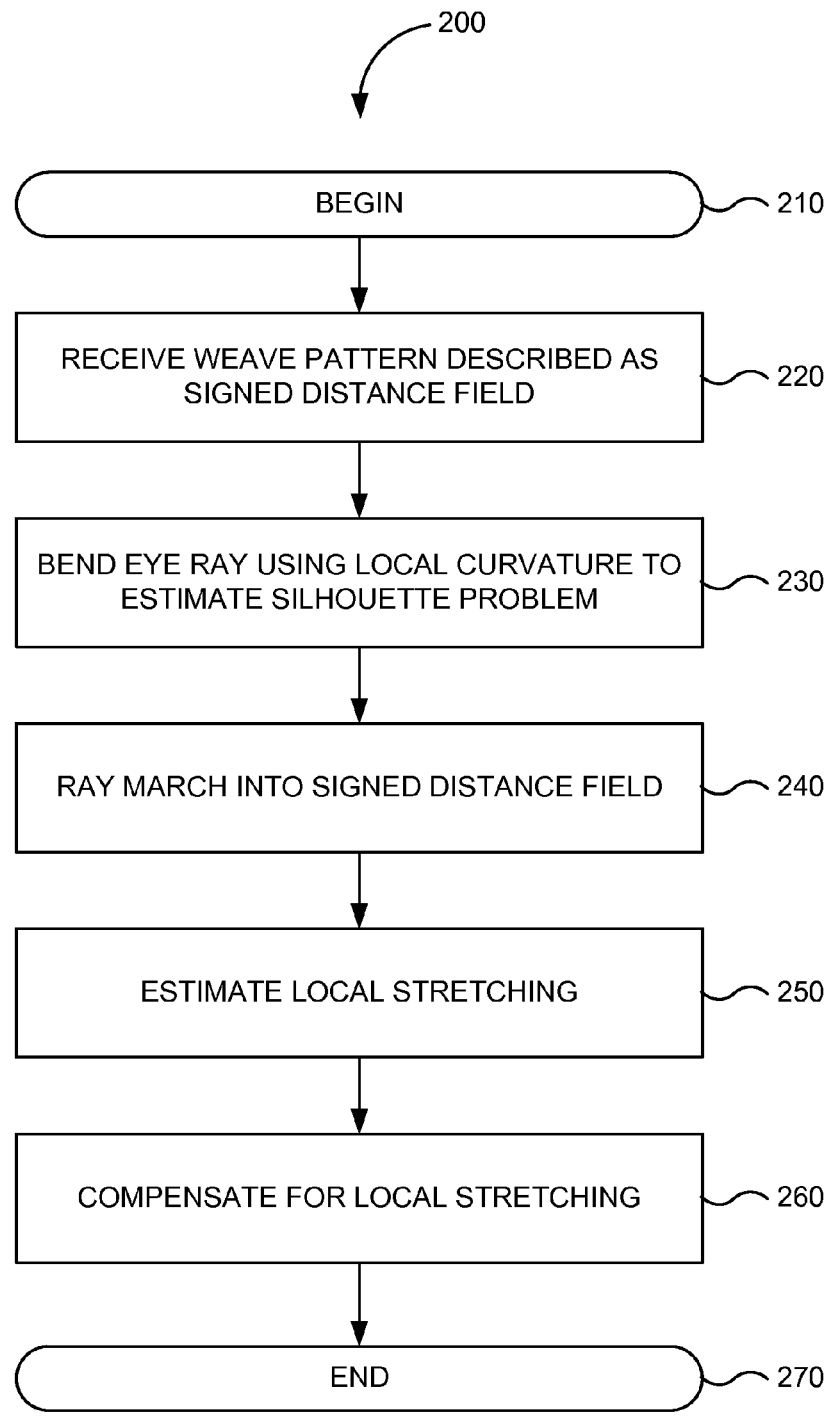
FIG. 2 is a simplified flowchart of a method for shading cloth in one embodiment.
Figure 3A:
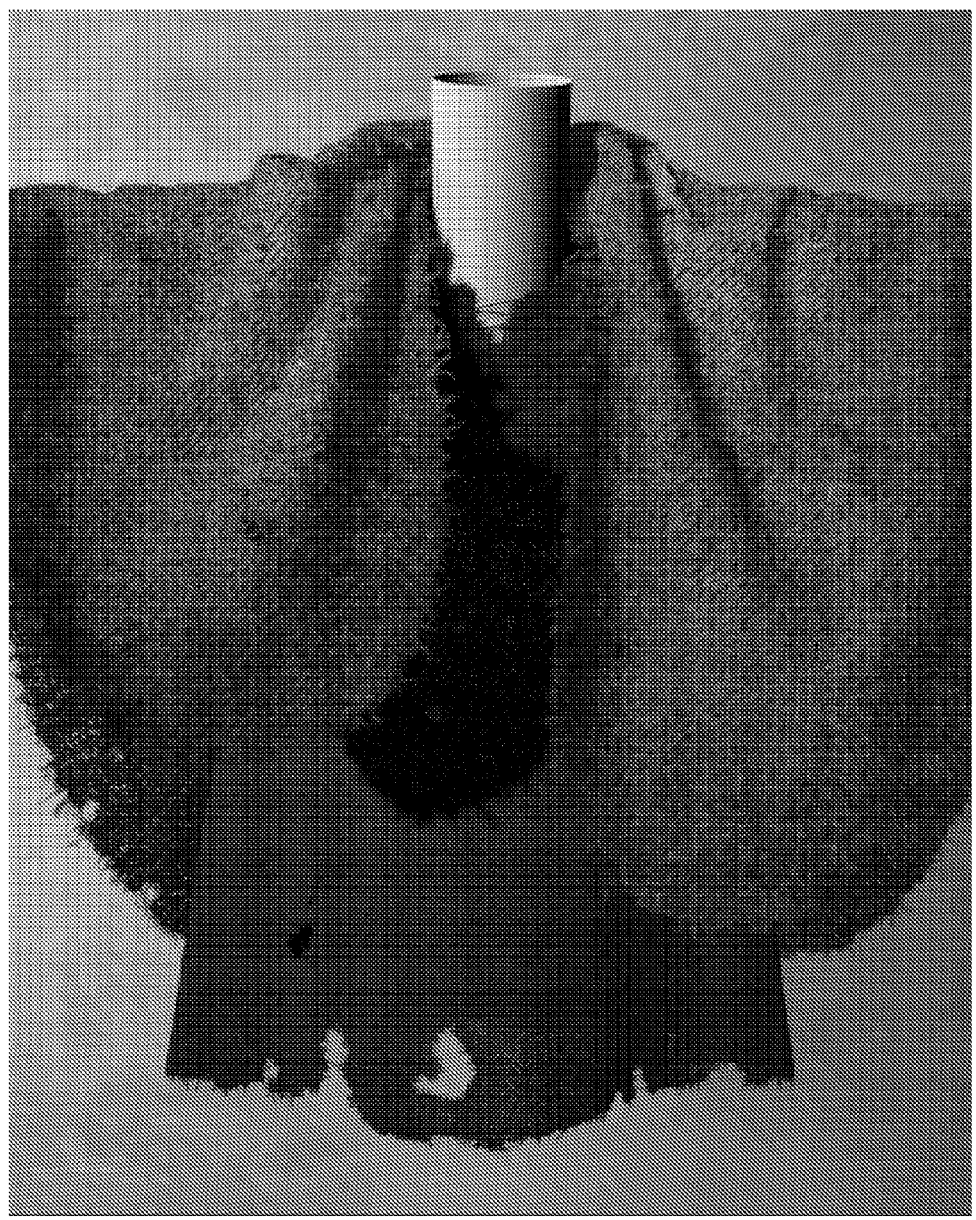
FIGS. 3A-3D are screenshots of images rendered for cloth shaded using techniques in various embodiments.
Figure 3B:
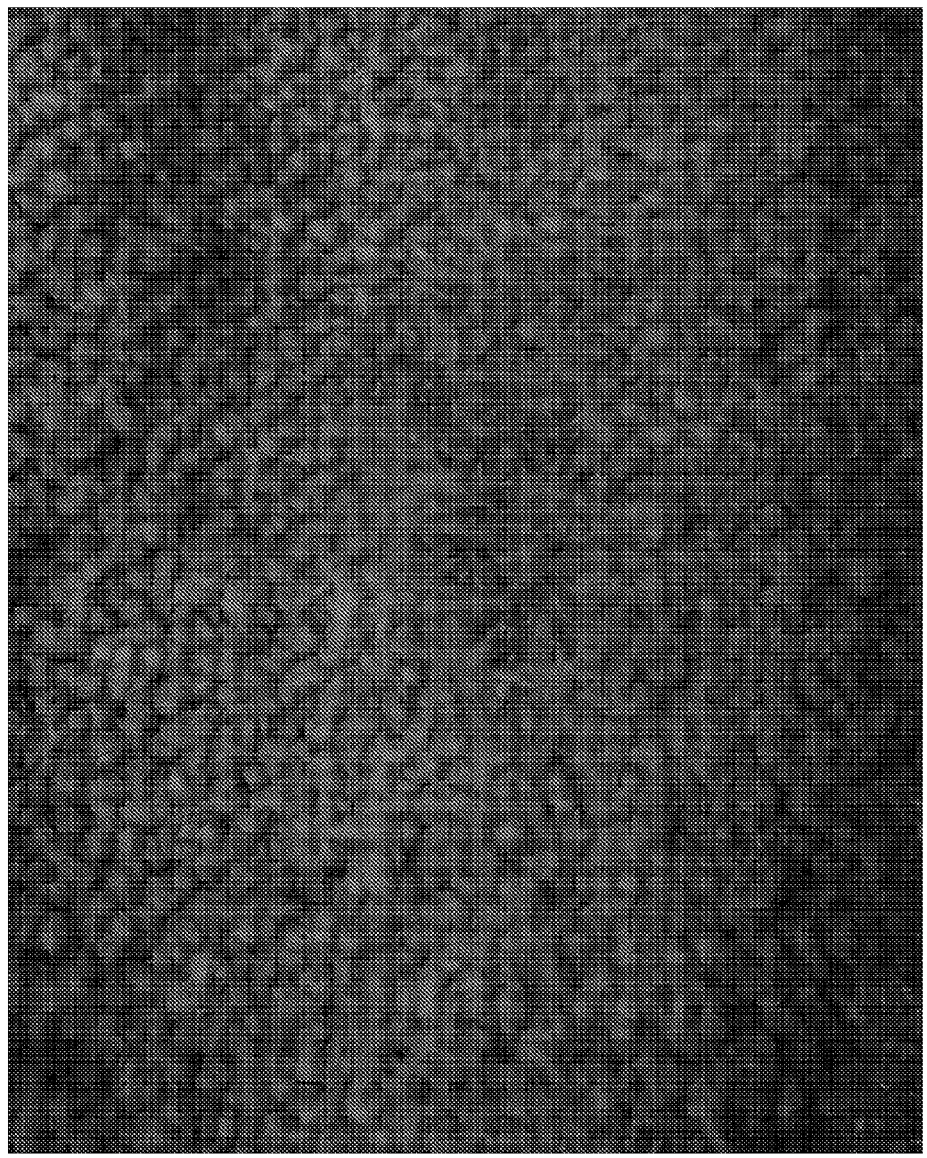
Figure 3C:
Figure 3D:
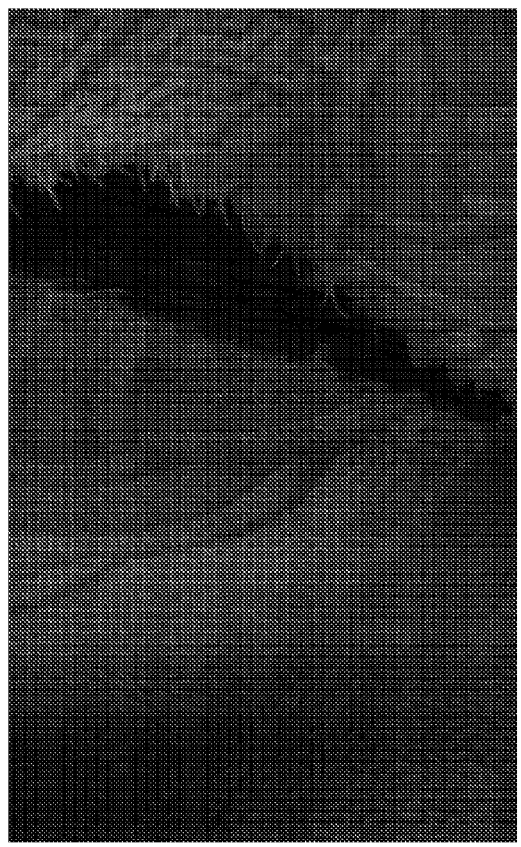

FIG. 2 is a simplified flowchart of a method for shading cloth in one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a weave pattern is received described as a signed distance field. In step 230, an eye ray is bent using local curvature to estimate the silhouette problem. In step 240, ray marching is performed into the signed distance field. In step 250, local stretching is estimated. In step 260, location stretching is compensated for. Method 200 of FIG. 2 ends in step 270.

Therefore, in various aspects, a volumetric shader is provided which is evaluated in tangent space and ray-marched through a weave pattern described as an implicit distance field. The distance field can be computed on-the-fly at very low computational cost. An adaptive marching step-size can be used for efficiency. Also, curved marching paths can be used based on an extrapolation of local surface curvature to allow rendering of broken silhouette edges.

In various embodiments, the shader takes input from a weave matrix to allow a wide variety of patterns to be created.

This technique offers major benefits such as automatic generation of a local ambient occlusion signal directly from the distance field at almost zero cost. Weave description can be adapted to the local stretch of the surface allowing yarns to separate realistically while retaining their width. Moreover, this can be extended to compute detailed subyarn (fiber) separation.

FIGS. 3A-3D are screenshots of images rendered for cloth shaded using techniques in various embodiments. In one aspect, a signed distance field is created to represent cloth. The eye ray is bent using local curvature to estimate silhouette problem. A ray is marched into the signed distance field, each thread has a soft shoulder. In another aspect, local stretching is estimated by comparing derivatives of UV with derivatives of geometry. Local stretching is compensated for. An ray-marched-tangent space shader which uses adaptive, curved ray marching of an implicit weave/thread procedural texture to create the appearance of individual cloth yarns complete with sub-fibers which separate rather than stretch over the surface.

Accordingly, because all shading is procedurally generated on-the-fly, local ambient occlusion can be computed at effectively no cost. The curved ray marching is used to create correct silhouettes at the edge of curved geometry. The curvature is extrapolated from local mesh curvature.

In further embodiments, a renderman plugin is provided which builds a cloth weave structure from curves over the surface of a subdivision mesh at rendertime. Many problems had to be solved for this such as global weave coherence issues. In one aspect, UV space to subdivision space mapping and numerous shading issues where corrected or compensated for. In some embodiments, curves are computed in per-face batches to keep memory use to a minimum. In another aspect, to achieve face-to-face yarn coherence, warp and weft (u & v) coordinates can be pre-computed in a parent RiProcedural. To avoid uv to world space distortion, in some embodiments, one or more Newton iterations are applied, such as to the initial yarn positions. Shading signals (such as local occlusion) can be baked into the curves as they were generated. A simplified version of the distance field shader of FIG. 2 can be used to render sub-yarn fibers.

Creation of Cloth Surface Over Subdivision Surfaces from Curves

In some embodiments, a coherent woven or knitted surface is generated from interwoven curve geometry and a subdivision (or polygon) mesh. In one aspect, this is done at rendertime. Accordingly, in one embodiment, a geometry generation process takes an ST map as input to control the direction of flow of curves (yarns) over the surface. Since each face is calculated independently, general global coordinates in ST space are predefined (at the beginning of the render) to make sure that each face transitions smoothly to the next.

Input parameters can be defined which control the layout and appearance of the generated curves. An input pattern can be used to define which curves lay under of over each other just as a real-life weaving pattern does. This allows for a large variation of weave styles (e.g., hounds tooth or herringbone).

In some aspect, the geometry generation problem process overcomes issues of wobbliness in the flow of curves (yarns) caused by interpolation misalignment (cubic vs linear) between the global subdivided surface space and input ST space. By running the surface placement evaluations twice, once to calculate an error estimate of the misalignment, and the subtracting the error from a second evaluation, a more accurate position is determined on the subdivision face for a curve (yarn) to lay. This is equivalent to one Newton's iteration. In various embodiments, ST boarders are automatically detected and used to generate modeled seams in the geometric cloth surface. These match real-life seem behavior to create the appearance stitched panels of fabric aligning to ST shells.

In further embodiments, a variation of the ray marched shader discussed above can be used to shade the curves. An extension is provided that solves the problem of wide (or close-up) curves (which are rendered as flat camera-facing ribbons) always appearing to rotate to face camera. A reference vector, locked to the base subdivision surface, is taken and the amount of camera-facing rotation the curve has undergone is calculated by making a comparison to this reference vector. The rotation is then subtracted from the rotation of the input yarn distance-field pattern.

Figure 4:
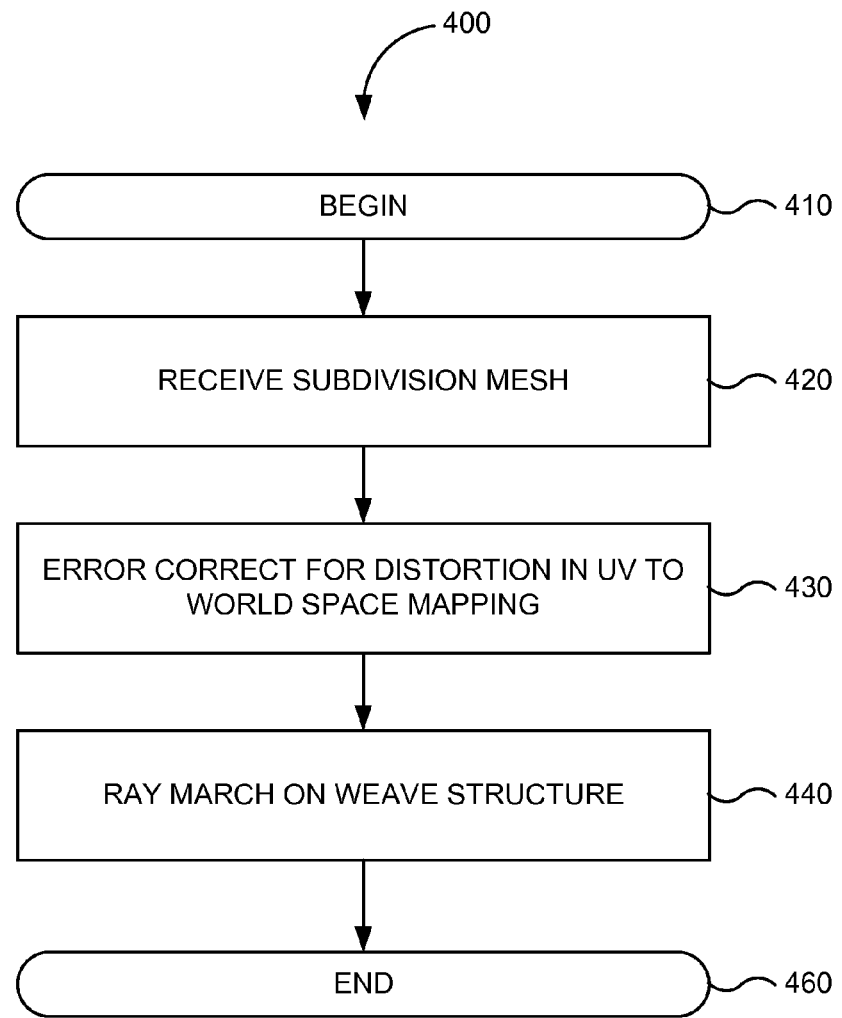
FIG. 4 is a simplified flowchart of a method for generating cloth in one embodiment.

FIG. 4 is a simplified flowchart of a method for generating cloth in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a subdivision mesh is received. In step 430, error correction is performed for distortion in UV to world space mapping. In some embodiments, one or more Netwon iterations are performed. In step 440, ray marching is performed onto a weave structure generated over the subdivision mesh. Method 400 of FIG. 4 ends in step 460.

Figure 5:
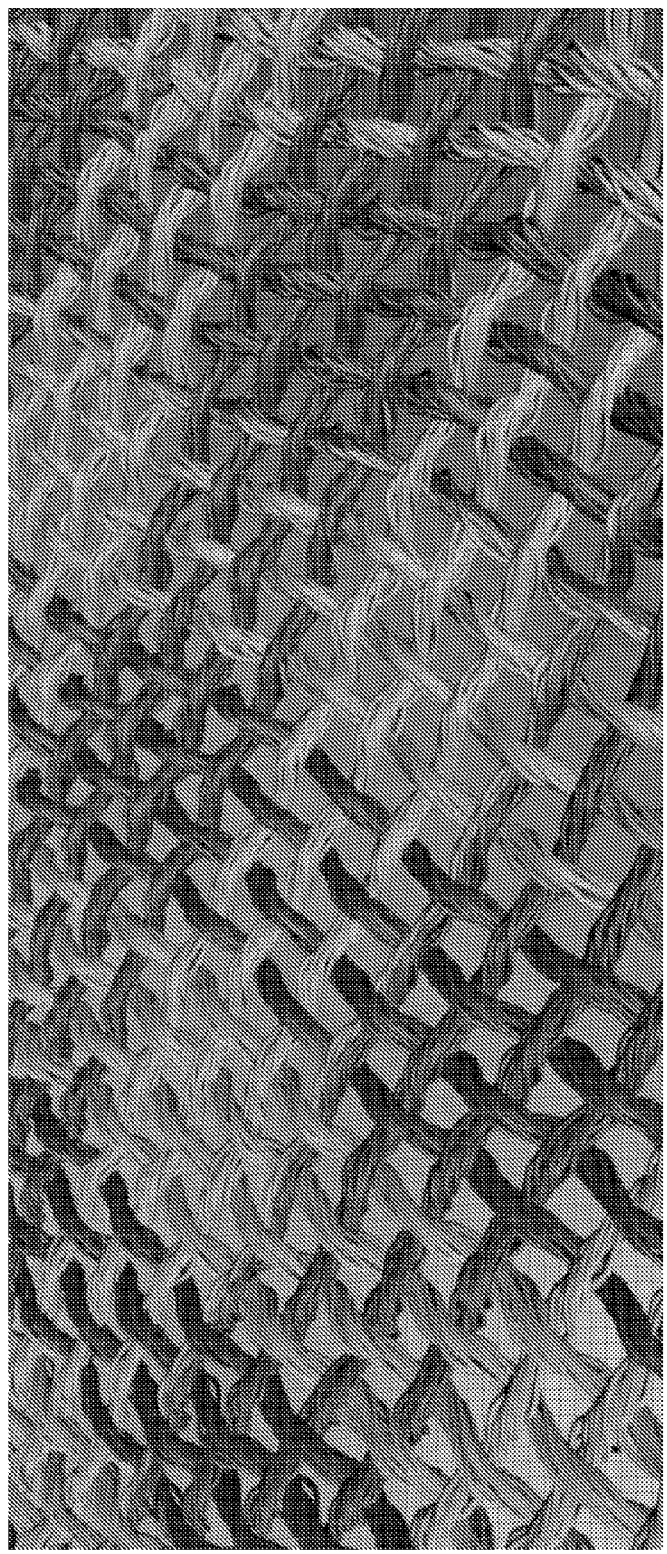
FIG. 5 is a screenshot of cloth generated in one embodiment.

FIG. 5 is a screenshot of cloth generated in one embodiment. In one aspect, cloth threads are represented as curves. In another aspect, one RI curve bundle is provided per face. In a further aspect, curves are generated on the fly or could be cached. In some aspects, face edges are made continuous or can represent seams. In some aspects, where parameterization problems may occur, the subdivision may be inverted. At least one iteration of Newton's method is applied to approximate the inversion to solve problems of curves "curving" within the face. In a further aspect, RICurves are still shaded with signed distance fields with soft shoulders. In a still further aspect, the curves are ray marched. Stitch pattern can be dictated by input from modeled nurbs surface "pattern".

Accordingly, techniques are provided for the creation of a cloth surface over subdivision mesh from curves. RiCurves are generated at render-time over the surface of a subdivision mesh. An error correction technique is implemented to allow mapping from UV space to world space without the distortion which would normally exist when performing this task. A version of the ray-marched procedural texture of FIG. 2 is used directly on the curves themselves. For camera-facing curves, the texture is rotated back against itself to adapt.

In further embodiments, the above techniques are applicable to cloth as well as tapestries. These can feature tears that reveal frayed edges. A tapestry may require specific layout of stitches to form embroidery. A Maya plugin can be used to converte arbitrary NURBS geometry (Patches, Curves or Trimmed surfaces) to a stitch pattern. This along with auxiliary data can be written to a custom cache file. The cache can be used as direct input for a general curve cloth system. Tearing can be achieved by dynamically animating surface mesh vertex varying primitive variables which were interpreted by the curve cloth DSO as holes or edges.

Figure 6:
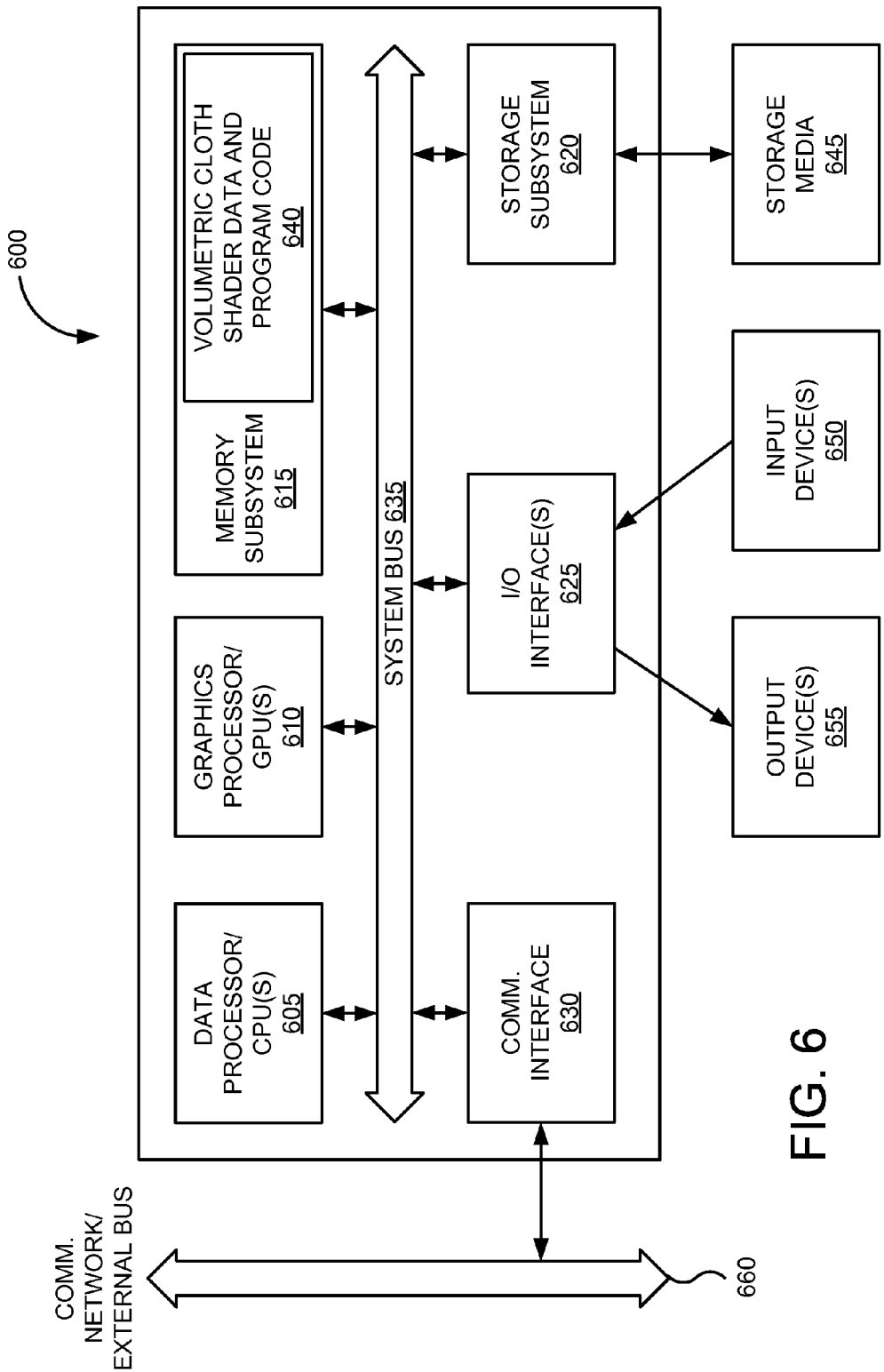
FIG. 6 is a block diagram of a computer system or information processing device that may incorporate an embodiment, be incorporated into an embodiment, or be used to practice any of the innovations, embodiments, and/or examples found within this disclosure.

FIG. 6 is a block diagram of computer system 600 that may incorporate an embodiment, be incorporated into an embodiment, or be used to practice any of the innovations, embodiments, and/or examples found within this disclosure. FIG. 6 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 600 can include hardware and/or software elements configured for performing logic operations and calculations, input/output operations, machine communications, or the like. Computer system 600 may include familiar computer components, such as one or more one or more data processors or central processing units (CPUs) 605, one or more graphics processors or graphical processing units (GPUs) 610, memory subsystem 615, storage subsystem 620, one or more input/output (I/O) interfaces 625, communications interface 630, or the like. Computer system 600 can include system bus 635 interconnecting the above components and providing functionality, such connectivity and inter-device communication. Computer system 600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 605 can include hardware and/or software elements configured for executing logic or program code or for providing application-specific functionality. Some examples of CPU(s) 605 can include one or more microprocessors (e.g., single core and multi-core) or micro-controllers. CPUs 605 may include 4-bit, 8-bit, 12-bit, 16-bit, 32-bit, 64-bit, or the like architectures with similar or divergent internal and external instruction and data designs. CPUs 605 may further include a single core or multiple cores. Commercially available processors may include those provided by Intel of Santa Clara, Calif. (e.g., x86, x86 64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 605 may also include one or more field-gate programmable arrays (FPGAs), application-specific integrated circuits (ASICs), or other microcontrollers. The one or more data processors or central processing units (CPUs) 605 may include any number of registers, logic units, arithmetic units, caches, memory interfaces, or the like. The one or more data processors or central processing units (CPUs) 605 may further be integrated, irremovably or moveably, into one or more motherboards or daughter boards.

The one or more graphics processor or graphical processing units (GPUs) 610 can include hardware and/or software elements configured for executing logic or program code associated with graphics or for providing graphics-specific functionality. GPUs 610 may include any conventional graphics processing unit, such as those provided by conventional video cards. Some examples of GPUs are commercially available from NVIDIA, ATI, and other vendors. In various embodiments, GPUs 610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 610 may include any number of registers, logic units, arithmetic units, caches, memory interfaces, or the like. The one or more data processors or central processing units (CPUs) 605 may further be integrated, irremovably or moveably, into one or more motherboards or daughter boards that include dedicated video memories, frame buffers, or the like.

Memory subsystem 615 can include hardware and/or software elements configured for storing information. Memory subsystem 615 may store information using machine-readable articles, information storage devices, or computer-readable storage media. Some examples of these articles used by memory subsystem 670 can include random access memories (RAM), read-only-memories (ROMS), volatile memories, non-volatile memories, and other semiconductor memories. In various embodiments, memory subsystem 615 can include volumetric shader data and program code 640.

Storage subsystem 620 can include hardware and/or software elements configured for storing information. Storage subsystem 620 may store information using machine-readable articles, information storage devices, or computer-readable storage media. Storage subsystem 620 may store information using storage media 645. Some examples of storage media 645 used by storage subsystem 620 can include floppy disks, hard disks, optical storage media such as CD-ROMS, DVDs and bar codes, removable storage devices, networked storage devices, or the like. In some embodiments, all or part of volumetric shader data and program code 640 may be stored using storage subsystem 620.

In various embodiments, computer system 600 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 600 may also include one or more applications configured to execute, perform, or otherwise implement techniques disclosed herein. These applications may be embodied as volumetric shader data and program code 640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 615 and/or storage subsystem 620.

The one or more input/output (I/O) interfaces 625 can include hardware and/or software elements configured for performing I/O operations. One or more input devices 650 and/or one or more output devices 655 may be communicatively coupled to the one or more I/O interfaces 625.

The one or more input devices 650 can include hardware and/or software elements configured for receiving information from one or more sources for computer system 600. Some examples of the one or more input devices 650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 650 may allow a user of computer system 600 to interact with one or more non-graphical or graphical user interfaces to enter a comment, select objects, icons, text, user interface widgets, or other user interface elements that appear on a monitor/display device via a command, a click of a button, or the like.

The one or more output devices 655 can include hardware and/or software elements configured for outputting information to one or more destinations for computer system 600. Some examples of the one or more output devices 655 can include a printer, a fax, a feedback device for a mouse or joystick, external storage systems, a monitor or other display device, a communications interface appropriately configured as a transceiver, or the like. The one or more output devices 655 may allow a user of computer system 600 to view objects, icons, text, user interface widgets, or other user interface elements.

A display device or monitor may be used with computer system 600 and can include hardware and/or software elements configured for displaying information. Some examples include familiar display devices, such as a television monitor, a cathode ray tube (CRT), a liquid crystal display (LCD), or the like.

Communications interface 630 can include hardware and/or software elements configured for performing communications operations, including sending and receiving data. Some examples of communications interface 630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 630 may be coupled to communications network/external bus 680, such as a computer network, to a FireWire bus, a USB hub, or the like. In other embodiments, communications interface 630 may be physically integrated as hardware on a motherboard or daughter board of computer system 600, may be implemented as a software program, or the like, or may be implemented as a combination thereof.

In various embodiments, computer system 600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 600.

As suggested, FIG. 6 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for shading surfaces, the method comprising:
   receiving, at one or more computer systems, information identifying a surface of a first object;
   receiving, at the one or more computer systems, information defining a signed distance field specifying a texture;
   ray-marching, with one or more processors associated with the one or more computer systems, within the interior of the surface using the signed distance field and a tangent space of the surface;
   determining, with the one or more processors associated with the one or more computer systems, placement in the tangent space of a portion of the texture; and
   generating, with the one or more processors associated with the one or more computer systems, information configured to render the texture based on the determined placement of the portion of the texture.

2. The method of claim 1 further comprising:
   determining, with the one or more processors associated with the one or more computer system, local surface curvature of a portion of the surface; and
   generating, with the one or more processors associated with the one or more computer systems, information configured to compensate for local stretching of the texture at the portion of the surface.

3. The method of claim 1 wherein ray marching, with the one or more processors associated with the one or more computer systems, into the signed distance field comprises curving a ray based on the signed distance field.

4. The method of claim 1 wherein ray marching, with the one or more processors associated with the one or more computer systems, into the signed distance field comprises determining a next step-size based on a value of the signed distance field that is different from the previous step-size.

5. The method of claim 1 wherein generating, with the one or more processors associated with the one or more computer systems, the information configured to render the texture comprises determining a volume within the surface representing the texture.

6. The method of claim 1 wherein the texture represents cloth.

7. The method of claim 1 wherein the texture represents scales.

8. The method of claim 1 further comprising rendering, with the one or more processors associated with the one or more computer systems, one or more images of the surface based on the information configured to render the texture.

9. A non-transitory computer-readable medium storing computer-executable instructions, which when executed by a processor, allow the processor to perform a method for shading surfaces, the method comprising:
   receiving information identifying a surface of a first object;
   receiving information defining a signed distance field specifying a texture;
   ray-marching within the interior of the surface using the signed distance field and a tangent space of the surface;
   determining placement in the tangent space of a portion of the texture; and
   generating information configured to render the texture based on the determined placement of at least the portion of the texture.

10. The non-transitory computer-readable medium of claim 9, the method further comprising:
    determining local surface curvature of a portion of the surface; and
    generating information configured to compensate for local stretching of the texture at the portion of the surface.

11. The non-transitory computer-readable medium of claim 9 wherein ray marching into the signed distance field comprises curving a ray based on the signed distance field.

12. The non-transitory computer-readable medium of claim 9 wherein ray marching into the signed distance field comprises determining a next step-size based on a value of the signed distance field that is different from the previous step-size.

13. The non-transitory computer-readable medium of claim 9 wherein generating the information configured to render the texture comprises determining a volume within the surface representing the texture.

14. The method of claim 1 wherein the texture represents cloth.

15. The method of claim 1 wherein the texture represents scales.

16. A system for shading surfaces, the system comprising:
a processor; and
a memory configured to store a set of instructions which when executed by the processor configured the processor to:
   receive information identifying a surface of a first object;
   receive information defining a signed distance field specifying a texture;
   ray-march within the interior of the surface using the signed distance field and a tangent space of the surface;
   determine placement in the tangent space of a portion of the texture; and
   generate information configured to render the texture based on the determined placement of at least the portion of the texture.

17. The system of claim 16 wherein the processor is further configured to:
   determine local surface curvature of a portion of the surface; and
   generate information configured to compensate for local stretching of the texture at the portion of the surface.

18. The system of claim 16 wherein to ray march into the signed distance field the processor is configured to curve a ray based on the signed distance field.

19. The system of claim 16 wherein to ray march into the signed distance field the processor is configured to determine a next step-size based on a value of the signed distance field that is different from the previous step-size.

20. The system of claim 16 wherein to generate the information configured to render the texture the processor is configured to determine a volume within the surface representing the texture.

* * * * *